United States Patent [19]

Hassell

[11] 4,097,058
[45] Jun. 27, 1978

[54] CABLE OPERATED LOG BUNK

[76] Inventor: Dennis Ray Hassell, 250 Dead Indian Rd., Ashland, Oreg. 97520

[21] Appl. No.: 739,490

[22] Filed: Nov. 8, 1976

[51] Int. Cl.² .............................................. B60P 7/00
[52] U.S. Cl. .................................... 280/145; 105/380
[58] Field of Search ................ 280/145; 105/380, 381, 105/387

[56] References Cited

U.S. PATENT DOCUMENTS

| 2,663,572 | 12/1953 | Vinson | 280/145 |
| 2,677,552 | 5/1954 | Dodds et al. | 280/145 |
| 2,828,140 | 3/1958 | Hassell | 280/145 |
| 3,033,592 | 5/1962 | Hassell | 280/145 |
| 3,058,772 | 10/1962 | Gourley | 280/145 |

Primary Examiner—Richard A. Bertsch
Attorney, Agent, or Firm—Eugene D. Farley

[57] ABSTRACT

A log bunk assembly comprises a bunk and a pair of stakes hinged thereto, one at each end. A flexible link is secured at one of its ends medially to each stake. The link is connected at its other end medially and releasably to the bunk through latch means operable from the far side of the bunk.

12 Claims, 9 Drawing Figures

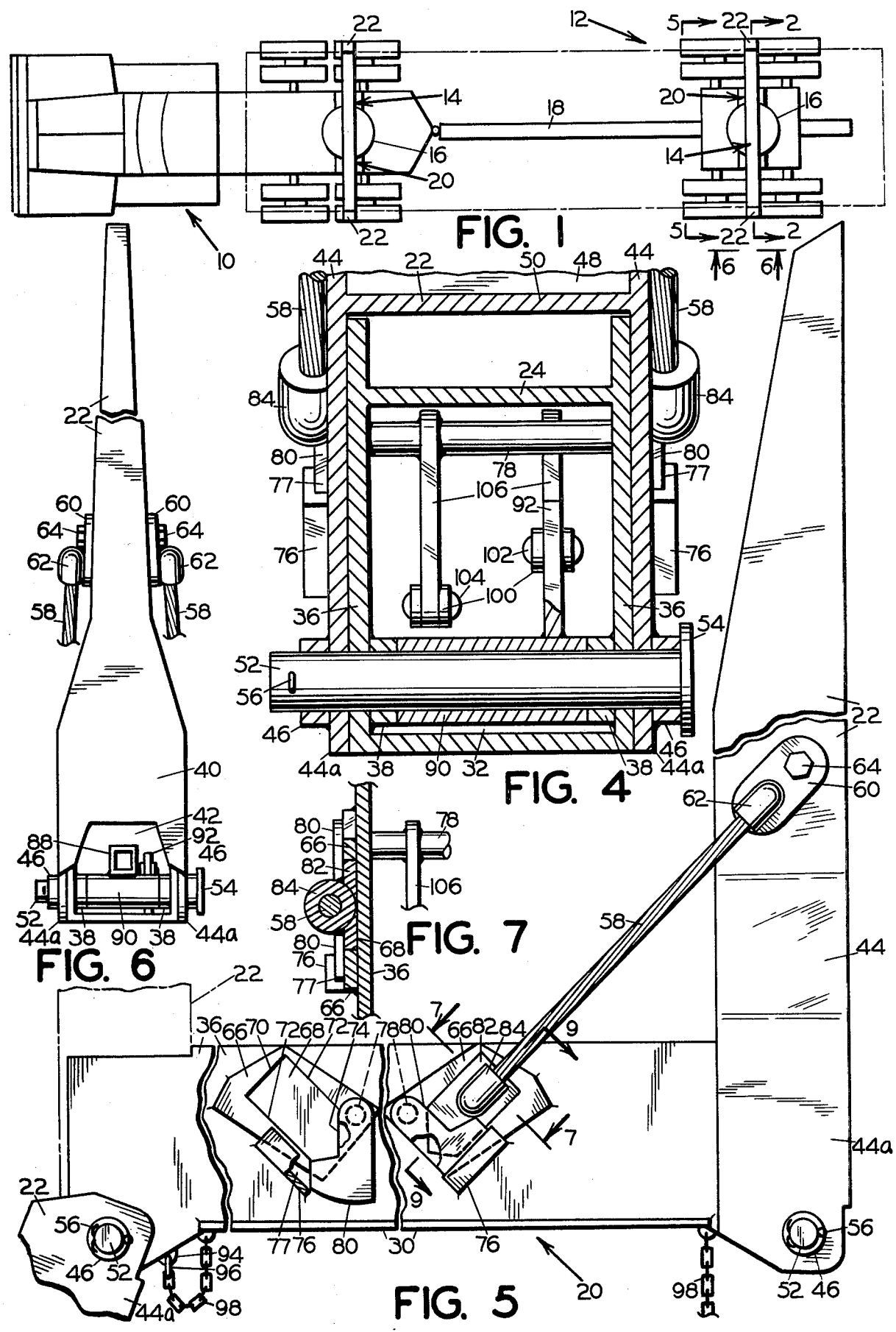

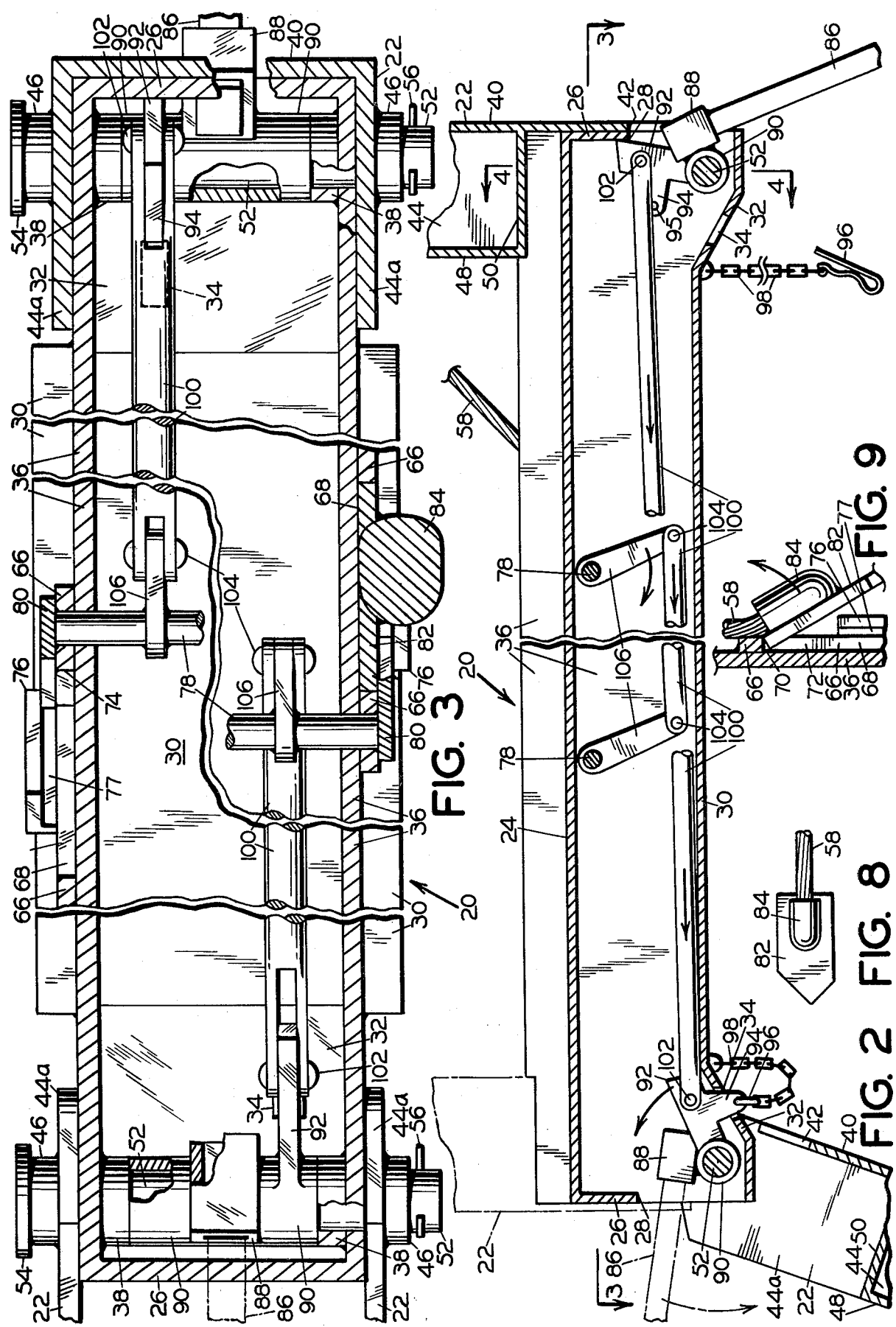

CABLE OPERATED LOG BUNK

BACKGROUND AND GENERAL STATEMENT OF THE INVENTION

This invention relates to log bunks of the class used for retaining logs on trucks, railroad cars and other vehicles.

During logging operations, the logs conventionally are transported from the logging site to the mill on vehicles provided with two or more bunks extending transversely of the vehicle at spaced intervals and provided at their ends with stakes for retaining the loaded logs. After the load has reached its destination and is ready to be discharged, the stakes are latchreleased, permitting the logs to roll off. Because of the great weight and cumbersome character of the logs, their transportation and discharge in this manner obviously is dangerous, and many accidents are caused by failure of the bunk or stake mechanisms.

Two types of prior art latching systems conventionally are used in the operation of the releasable stakes. One type utilizes spring biasing or other return means to return the latch to a latched position automatically after release of the stakes. This type of latching mechanism is shown in my prior patent U.S. Pat. No. 3,033,592. Latching mechanisms of this class normally are contained inside the stake.

The second type of commonly used latching mechanism employs positive means for latching and unlatching the stake. Although many prior art latching systems of this class have required at least certain portions of the latching mechanism to be placed outside the stake, or have required that the stakes be offset from one another longitudinally of the vehicle to accommodate the latching mechanism, my prior patent U.S. Pat. No. 3,977,695 discloses a latching mechanism which does not require offsetting the stakes and which houses the mechanism completely within the stake and bunk.

The present invention provides a log bunk assembly of the positively latched, self-contained class and therefore is characterized by the advantages attending the operation of such devices.

Thus the stake exterior is left free to accommodate necessary attachments such as lights and piggy-back carriers. In addition, the stakes can be mounted on the bunk without being longitudinally offset from each other, thereby increasing the load which they are capable of carrying. Furthermore the latch release mechanism inside the stake does not become fouled with bark and other debris, thereby protecting it from physical damage during the log loading and unloading operations.

Additionally, however, the presently described log bunk assembly is cable-operated and hence relatively simple and inexpensive in construction. Other advantages attending the use of my new log bunk assembly include the following.

It is strong, with a built-in safety factor in that a plurality of cables may be associated with each bunk so that if one cable fails the other will hold.

It is fool-proof in operation.

It cannot foul with bark and other debris.

It is light in weight, since the cable employed is short and the use of a multiplicity of mechanical parts is eliminated.

It is unencumbered.

It is easy to remove the stakes from the bunk for repair or replacement.

It is easy to trip against extreme pressure.

It cannot hang up.

One person can replace the stake quickly after it is tripped.

There is no kickback upon tripping the stakes. The operator thus is protected from injury.

It is the general purpose of the present invention to provide a log bunk assembly characterized by the foregoing advantageous features and which, in summary, is simple in construction; adaptable for use on various categories of log carrying vehicles; easy to use, service and maintain; and safe in operation.

Basically considered, the log bunk assembly of my invention comprises a bunk adapted for mounting transversely of a vehicle, a pair of stakes, and pivot means securing the lower end of each stake to an end of the bunk for angular movement between raised and lowered positions.

A pair of flexible link means such as cables are associated at least one with each stake. Securing means secure one end of each flexible link medially to its associated stake.

Latch means releasably secure the other end of each flexible link medially to the bunk. The latch means in essence comprises a socket provided on the bunk, a latch block secured to the end of the flexible link means and receivable in the socket, and a keeper releasably retaining the latch block in the socket.

The keeper is operated by latch operating means at the remote end of the bunk and connected through suitable connecting means to the keeper.

DESCRIPTION OF A SPECIFIC EMBODIMENT OF THE INVENTION

In the drawings:

FIG. 1 is a plan view of a log truck showing the installation of my log bunk thereon.

FIG. 2 is a foreshortened vertical longitudinal section of the bunk, taken along line 2—2 of FIG. 1.

FIG. 3 is a foreshortened horizontal sectional view of the bunk taken along line 3—3 of FIG. 2.

FIG. 4 is a fragmentary, detail, vertical sectional view taken along line 4—4 of FIG. 2 and illustrating in particular the manner of mounting a log bunk stake on a log bunk in accordance with my present invention.

FIG. 5 is a foreshortened view in side elevation of the bunk assembly looking in the direction of the arrows of line 5—5 of FIG. 1.

FIG. 6 is a foreshortened view in end elevation of the bunk assembly looking in the direction of the arrows of line 6—6 of FIG. 1.

FIG. 7 is a fragmentary, detail sectional view taken along line 7—7 of FIG. 5 and illustrating particularly a latch employed in the bunk assembly of my invention.

FIG. 8 is a fragmentary, detail view of a latch block employed in the latch of FIG. 7.

FIG. 9 is a fragmentary, detail sectional view taken along line 9—9 of FIG. 5 and illustrating the mode of operation of the latch.

Although the log bunk assembly of my invention may be used on vehicles of various classes, it generally is utilized on a log truck and is illustrated herein in that embodiment.

The log truck assembly comprises a tractor indicated generally at 10 and a trailer indicated generally at 12. Each of the tractor and trailer normally mounts a log bunk assembly 14 of the present invention by pivotable joinder means 16. Commonly one long bunk assembly 14 is mounted on the tractor above its rear axle and a companion log bunk assembly 14 is mounted on the trailer above its axle. The logs are loaded on the bunks and maintained within the dashed line area by the bunk assemblies in which they are contained.

When the truck is empty, trailer 12 also is transported piggy-back above the tractor. Trailer rider pads (not shown) generally are placed on the rear portion of the tractor near the forward log bunk assembly 14 for this purpose.

Each log bunk assembly broadly comprises a bunk 20 and a pair of stakes 22, one pivotally mounted on each end of the bunk. The stakes move angularly between raised and lowered positions as required in the first instance to load the truck and transport the logs, and in the second instance to unload the logs from the truck after the truck has reached its destination.

In FIGS. 2 and 3 the hereindescribed log bunk assembly is shown in vertical and horizontal longitudinal sections, respectively, in order to illustrate the details of the stake release mechanism and the latching elements. The right hand stake is shown in its raised or latched position; the left hand stake, in its lowered or unlatched position. For convenience, the left hand stake also is shown in phantom as it would appear in the raised position.

Bunk 20 includes an H-type box frame fabricated from a plurality of plates welded together. It thus comprises a top plate 24 having turned down ends forming end plates 26. The end plates are shortened to provide access openings 28 for a lever used in operating the stake mechanism.

Bottom plate 30 is spaced vertically from top plate 24 and has a downwardly angled extension 32 at each end to provide a housing for the stake operating mechanism. Downwardly angled section 32 contains an opening 34 which receives a locking extension of the stake operating mechanism.

Spaced side plates 36 are provided at their terminal portions with inwardly extending bosses 38 which serve as bearings.

The box frame thus constituted mounts one of stakes 22 at each end.

Each stake comprises a box frame structure fabricated from plates welded together. Front stake plate 40 has an access opening 42 which in the raised position of the stake registers with access opening 28 of bunk end plate 26.

Side plates 44 have extensions 44a on the terminal portions of which are mounted outwardly projecting bosses 46. These register with inwardly projecting bosses 38 of the bunk side plates and, like them, provide bearings.

A back plate 48 and a bottom plate 50 also are included in the box frame structure of the stake.

Pivotal mounting means mounts each stake to an end of the bunk. The design of the mounting means is such that the stake may be removed readily from the bunk when this is required for repair, replacement, or during piggy-back carrying of the trailer.

To this end side plate extensions 44a of the stakes lap side plates 36 of the bunk. The lapping portions of both of these members are provided with aligned openings which register also with inwardly directed bosses 38 on the bunk side plates and outwardly directed bosses 46 on the stake side plate extensions. As noted, these bosses serve as bearings and receive a pivot pin or shaft 52. The pivot pin has on one end an integral head 54 and at the other end a retainer 56. Accordingly, it becomes a simple matter to remove the stake completely from the bunk. This is accomplished merely by removing retainer 56, grasping the head 54 of pivot pin 52, and removing it from its bearings.

As illustrated in FIG. 2, the pivot pin mounting provides means not only for removing the stake from the bunk, but also for swinging it between a raised, log-carrying position and a lowered log-discharging position. Flexible link means support each stake in its elevated position.

The flexible link means employed for this purpose may comprise chains, but preferably comprise short, heavy duty cables 58. Because of the heavy loads carried on the vehicle, and also for security reasons, there preferably are two such cables. Although the double cable arrangement is not apparent in FIG. 3 because of the foreshortened character of that figure, it is explicitly evident in FIG. 4. The cables are arranged symmetrically and their construction and manner of mounting may be identical.

Each cable is arranged at an appropriate angle of about 45°, to accommodate the curvature of the logs. It interconnects a medial portion of the stake with a medial portion of the bunk, as seen in FIG. 5.

The securing means employed for securing the upper end of the cable to the stake comprises a plate 60 provided with a ferrule 62 having a flat undersurface which is welded to the plate. The ferrule receives the upper end of cable 58 and is swaged or otherwise securely fastened to it. Suitable fastening means such as bolts 64 secure the plate , and hence the upper end of cable 58, to the outer face of one of stake side plates 44.

Latch means are provided for releasably securing the other end of each flexible cable medially to the bunk, preferably to the outer face of one of side plates 36 thereof. The construction of the latch means is shown particularly in FIGS. 5, 7 and 8.

Each latch means comprises a plate 66 welded to the bunk side plate. The plate encloses a socket 68 defined by an end wall 70, a pair of side walls 72 and an angular bottom wall 74. A guide plate 76, FIGS. 5 and 7, overlies and is spaced laterally outwardly from the lower portion of one side of latch plate 66. It forms a guideway 77.

A latch operating shaft 78 mounts a keeper or dog 80. The keeper has a shank portion fixed to the shaft and a toe portion received in guideway 77.

It is to be noted that latch shaft 78 extends completely across the bunk, transversely thereof, and mounts at its other end the keeper of a companion latch assembly associated with a cable on the other side of the bunk, FIG. 4.

Cable 58 mounts at its lower end a latch block 82. The latch block comprises a plate integrated with a ferrule 84, which has a flat face, swaged to the lower end of cable 58.

Latch block 82 is configured for reception in latch pocket 68 defined by latch plate 66, FIG. 8. It is of substantial thickness and has an angular end contoured to match the angular bottom wall 74 of latch plate 66.

Latch operating means is connected to latch keeper 80 for shifting it from the remote end of the bunk between latching and unlatching positions.

As shown particularly in FIGS. 2, 3 and 4, the latch operating means comprises a lever 86 an end of which is dimensioned for insertion in a socket 88. The latter is fixed to a sleeve 90 journaled on stake pivot pin 52, which thus serves a dual purpose. Socket 88 and lever 86 work in openings 28, 42 through the end plate and front plate of the bunk and stake, respectively, FIG. 2, and accordingly are readily accessible.

Rigid to sleeve 90 is a crank arm 92 having a laterally extending projection 94. This projection is dimensioned for extension through opening 34 in the angled portion 32 of stake bottom plate 30. It provides means for locking the latch in its latched position.

For this purpose it is provided with a terminal perforation 95 which receives a pin type retainer 96 on the end of a chain 98. The other end of the chain is mounted on bottom plate 30 of the bunk. When it is desired to lock the latch in its raised position, retainer 96 is inserted through the perforation so that crank arm 92 cannot be moved. However, when it is desired to release the latch, retainer 96 is slipped out of the perforation, permitting operation of the crank.

One end of a long connecting rod 100 is pivotally connected to the end of crank arm 92 by means of a pivot pin 102. The connecting rod extends almost the entire length of the bunk. Its other end is connected through a pivot pin 104 to a crank arm 106. The latter is rigid to latch shaft 78 and rotates the latter as required to work the latch, FIG. 4.

OPERATION

The operation of the hereindescribed log bunk assembly is as follows:

Logs are loaded onto the bunk with stakes 22 in their upright position. In this position, latch keepers 80 are received in guideways 77. They overlie latch blocks 82 and prevent them from popping out of latch sockets 68, FIGS. 5 and 7.

Projection 94 of each latch crank arm 92 extends through opening 34 in bottom bunk plate segment 32. Retainer 96 is inserted through perforation 95 in extension 94, preventing retraction of the extension through the opening and thereby locking the latch in its latched position, FIG. 2.

When the destination has been reached and it is desired to unload the logs, the operator, standing on the remote side of the truck from the stake to be lowered, removes retainer 96. He inserts lever 86 in lever socket 88 and moves it upwardly. This works crank arm 92, which in turn translates connecting rod 100 axially toward the other end of the bunk.

The rod thus operates latch crank shaft 78 and associated lever arm 106 thereby moving latch keeper 80 to its position of disengagement. Thereupon, the weight of the logs pressing against the inner face of stake 22 tensions cable 58 so that the action illustrated in FIG. 9 takes place.

Whereas during transit the upper surface of latch block 82 remains in bearing engagement with surface 70 of latch pocket 68 and thus takes the tension force of the cable, upon release of the latch the cable flexes, permitting latch block 82 to move angularly outwardly with its upper surface heeling against bearing surface 70 in the manner shown. When the latch block is removed completely from the pocket, stake 22 swings outwardly and downwardly.

This sequence is then repeated with the companion log bunk assembly of the tractor-truck combination, whereupon the logs gravitationally unload themselves on the side of the truck remote from the operator.

Having thus described my invention in preferred embodiments, I claim:

1. A log bunk assembly comprising:
   a. a bunk adapted for mounting transversely of a vehicle,
   b. a pair of stakes,
   c. pivot means securing the lower end of each stake to an end of the bunk for angular movement between raised and outwardly lowered positions,
   d. a pair of flexible link means one associated with each stake for securing the stake in said raised position,
   e. securing means securing one end of each flexible link means to its associated stake intermediate the ends of the latter,
   f. latch means releasably securing the other end of each flexible link means to the bunk intermediate the ends of the latter, whereby when each stake is secured in raised position the associated flexible link means extends angularly upward and outward from the bunk to its connection to the stake,
   g. a pair of latch-operating means mounted one at each end of the bunk and
   h. connecting means interconnecting each latch-operating means with the latch means at the remote end of the bunk for alternately shifting the latch means between latched and unlatched positions.

2. The log bunk assembly of claim 1 wherein the flexible link means comprises cable means.

3. The log bunk assembly of claim 1 wherein the latch means comprises a socket provided on the bunk, a latch block secured to said other end of the flexible link means and receivable in the socket, and a latch keeper connected to the latch operating means and releasably retaining the latch block in the socket.

4. The log bunk assembly of claim 3 wherein the keeper comprises a crank-operated keeper.

5. The log bunk assembly of claim 3 wherein the socket is located on a side face of the bunk and opens out to the side and the latch block comprises a plate configured for reception in the socket.

6. The log bunk assembly of claim 3 wherein the socket is provided on a side face of the bunk and opens out to the side, the latch block comprises a plate configured for reception in the socket, and the keeper comprises a crank-operated keeper overlying the latch block in the engaged position of the latch.

7. The log bunk assembly of claim 6 including guide means for guiding the movement of the keeper.

8. The log bunk assembly of claim 3 wherein the flexible link means comprises cable means and including a ferrule swaged to the end of the cable means and fixed to the latch block.

9. The log bunk assembly of claim 1 wherein the flexible link means comprises a cable and the securing means comprises a plate, a ferrule rigid to the plate and swaged to the end of the cable, and securing means attaching the plate to the stake.

10. The log bunk assembly of claim 1 wherein the latch operating means comprises lever-operated crank means.

11. The log bunk assembly of claim 1 including lock means for locking the latch operating means in the latched position of the latch means.

12. In a log bunk assembly comprising a bunk, a stake hinged thereto and angularly shiftable between raised and lowered positions, and latched flexible link means releasably locking the stake in a raised position: a latch sub-assembly comprising a socket, a latch block secured to an end of the flexible link means and receivable in the socket, and a keeper releasably retaining the latch block in the socket.

* * * * *